United States Patent
Rols et al.

(10) Patent No.: US 7,091,468 B2
(45) Date of Patent: Aug. 15, 2006

(54) DEVICE FOR IMAGE PROCESSING WITH RECOGNITION AND SELECTION OF LIGHT SOURCES

(75) Inventors: Olivier Rols, Pessac (FR); Pierre-Albert Breton, Pessac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/532,817

(22) PCT Filed: Oct. 14, 2003

(86) PCT No.: PCT/EP03/50717

§ 371 (c)(1),
(2), (4) Date: Apr. 26, 2005

(87) PCT Pub. No.: WO2004/040516

PCT Pub. Date: May 13, 2004

(65) Prior Publication Data

US 2006/0049333 A1   Mar. 9, 2006

(30) Foreign Application Priority Data

Oct. 29, 2002 (FR) .................................. 02 13540

(51) Int. Cl.
*H01J 40/14* (2006.01)
*H01L 31/00* (2006.01)
*B64F 1/18* (2006.01)

(52) U.S. Cl. .............................. 250/214 R; 250/208.1; 250/330; 382/274; 340/952

(58) Field of Classification Search ............. 250/208.1, 250/214 R, 330; 382/254, 274; 340/952, 340/953, 956; 348/113, 117
See application file for complete search history.

(56) References Cited

U.S. PATENT DOCUMENTS 5,719,567 A * 2/1998 Norris ........................ 340/953
6,232,602 B1  5/2001 Kerr

FOREIGN PATENT DOCUMENTS

EP       0604245 A     6/1994

OTHER PUBLICATIONS

Roberts B. et al "Image processing for flight crew enhanced situation awareness" Sensing, Imaging, and Vision for control and guidance of aerospace vehicles, Orlando, FL, Apr. 4-5, 1994, vol. 2220, pp. 246-255.

(Continued)

*Primary Examiner*—Kevin Pyo
(74) *Attorney, Agent, or Firm*—Lowe Hauptman & Berner, LLP

(57) ABSTRACT

The invention relates to devices for processing images making it possible to identify, to process and to select discrete light sources present in a video image composed of pixels. The aim is the presentation, in real time, to a user of a processed image allowing better recognition of light sources in a weakly contrasted image. In aeronautical use, this device affords a landing aid by allowing better recognition of runway lamps in conditions of degraded visibility, in particular in foggy weather. The invention relies on three major principles: 1) the main processing of images is performed only on a small number of pixels whose level is greater than a threshold; 2) a likelihood estimator evaluates the probability of existence of sources in the image; 3) the threshold is variable as a function of a certain number of parameters of the image.

21 Claims, 3 Drawing Sheets

OTHER PUBLICATIONS

Dickmanns E D et al: "Experimental results in autonomous landing approaches by dynamic machine vision" Sensing, Imaging, and Vision for control and guidance of aerospace vehicles, Orlando, FL, Apr. 4-5, 1994 vol. 2220, pp. 304-313.

Le Guilloux Y et al: "Using image sensors for navigation and guidance of aerial vehicles" Sensing, Imaging, and Vision for control and guidance of aerospace vehicles, Orlando, FL, Apr. 4-5, 1994, vol. 2220, pp. 157-168.

Oakley J P et al: "Improving Image Quality in poor visibility conditions using a physical model for contrast degradation" IEEE Transactions on Image Processing, NY vol. 7, No. 2 Feb. 1, 1998 pp. 167-179.

* cited by examiner

DEVICE FOR IMAGE PROCESSING WITH RECOGNITION AND SELECTION OF LIGHT SOURCES

CROSS-REFERENCE TO RELATED APPLICATIONS

The present Application is based on International Application No. PCT/EP2003/050717, filed on Oct. 14, 2003, which in turn corresponds to FR 02/13540 filed on Oct. 29, 2002, and priority is hereby claimed under 35 USC §119 based on these applications. Each of these applications are hereby incorporated by reference in their entirety into the present application.

FIELD OF THE INVENTION

The field of the invention is that of devices for processing images making it possible to identify, to process and to select representations of discrete light sources present in a video image composed of pixels. The object of these devices is the presentation, in real time, to a user of a processed image allowing better recognition of representations of weakly contrasted light sources.

Aeronautics constitutes a favored field of application of this type of device in so-called EVS (Enhanced Vision System) systems by affording an effective aid to landing in conditions of degraded visibility, in particular in foggy weather. Specifically, to land, it is vital that the pilot or the landing aid system should be aware of the lateral position of the machine with respect to the ideal trajectory bringing the machine onto the axis of the runway.

DESCRIPTION OF THE PRIOR ART

Historically, when flying by sight and in clear weather, the pilot would estimate the position of his machine with respect to the edges of the runway. The introduction of airport lights, of codified structure, consisting of high intensity runway lamps has allowed the pilot to undertake this task even when flying at night or in slightly foggy conditions. When the meteorological conditions degrade further, for example in conditions of severe fog with visibility of less than 200 meters, these systems are no longer adequate.

The ILS (Instrument Landing System) has been used since 1970 to provide the pilot and the automatic pilot, with the aid of two fixed radio frequency beams, with the necessary lateral positioning information. Nowadays, new systems are envisaged, such as MLS (Microwave Landing System) derived from ILS but allowing a greater variety of approaches, or systems based on GPS (Global Positioning System) or a GPS/inertial platform hybridization. The common constraint shared by these various systems is the need to install additional equipment on the ground and aboard the machine to achieve the necessary positioning accuracy. The certifying authorities demand, in fact, an accuracy which is typically of the order of three meters. These installations (differential GPS station, MLS transmitter, etc.) incur additional acquisition and maintenance costs which may be very significant for certain lightweight airport infrastructures dedicated, for example, to regional and business airplanes or to military transport machines.

So-called EVS (Enhanced Vision System) manual landing aids make it possible to alleviate the absence of radiofrequency systems for aiding the approach. FIG. 1 represents the general diagram of an EVS chain. It comprises an image sensor 2, an image processing device 1 and a viewing device 3. An observer 4 looks at the final image through said device 3. A specialized electronic unit 100 providing the position and the attitude of the aircraft is interfaced with the image processing unit 1. Links 21, 31 and 101 connect the various components of the system. The sensor 2 provides an image in a spectral band matched to the light sources to be detected. This is generally an FLIR (Forward Looking InfraRed). In the case of runway lamps having their emission peak around 1 micron, the sensor's spectral sensitivity band is therefore situated in the near infrared, at the limit of the visible spectrum. The unit 100 makes it possible to compare the alteration of the parameters of the image with the real displacements of the aircraft. The viewing device is conventionally a head-up viewfinder, making it possible to display the final image provided by the processing device 1 superimposed on the exterior, this disposition makes it possible to project the image of the runway lamps estimated in the actual directions of said lamps, the pilot thus being aware of his position with respect to the ideal landing trajectory.

This first imager may usefully be supplemented with a second FLIR imager working in a second infrared band lying, for example, between 8 and 12 microns. This second imager then provides a thermal image of the landing zone.

Two parameters make it possible to judge the quality of the processing device. These are on the one hand, the percentage of runway lamps identified and on the other hand the percentage of artifacts not corresponding to real runway lamps.

The main difficulties of the image processing are that the latter must work in real time so that the pilot perceives an image corresponding to reality without a notable time shift, thereby excluding any sophisticated processing of the image, and on the other hand, the processing must preserve its performance rating for images, that are by nature variable.

SUMMARY OF THE INVENTION

The image processing device according to the invention makes it possible to alleviate these various drawbacks. The core of the invention relies on three principles:
 the main processing of images is performed only on a small number of pixels whose level is greater than a threshold;
 a likelihood estimator evaluates the probability of existence of light sources in the image;
 the threshold is variable as a function of a certain number of parameters of the image.

More precisely, a subject of the invention is an electronic device for image processing generating an output image from an input image, the two images being composed of pixels, the input image originating from a first video sensor and representative of a scene containing at least one discrete light source, said input image containing a first representation of said discrete light source, the output image comprising a second representation of said discrete light source, characterized in that said device comprises at least:
 an electronic unit for improving contrast making it possible to provide on the basis of the input image an image with better contrast;
 an electronic unit for selection making it possible to provide on the basis of the image with better contrast a filtered image now containing only at least a first set of pixels whose electronic level is situated above a first threshold, said first set corresponding to the representation of at least one potential light source;

an electronic likelihood estimation unit, making it possible to provide on the basis of the first set of pixels of the filtered image an estimated image comprising a second set of pixels, said second set corresponding to the representation of estimated light sources, the distributions of the pixels of the representations of the estimated sources corresponding to bidimensional mathematical functions; with each representation of estimated light source there being associated a likelihood probability;

an electronic unit for validation providing on the basis of the estimated image the final image, said image containing a representation of the estimated light source if the associated likelihood probability is greater than a second threshold.

Advantageously, the level of the first threshold depends at least on said validation unit.

Advantageously, said electronic function for improving the contrast of the initial input image comprises at least one matrix filter of CBF (contrast box filter) type applied to each pixel level of the initial input image to obtain the contrasted input image. Said matrix is in particular a square matrix of M rows and M columns of elements, the N central elements having one and the same first value, the other ($M^2-N$) elements of the matrix having one and the same second value equal to said first value multiplied by $N/(N-M^2)$.

The main functions of the estimator are:
the electronic function for recognition of the shape of the representation of the light sources,
the electronic function for recognition of the geometrical disposition of said representations of said sources,
the electronic function for estimation of displacement of said representations of said sources.

The electronic function for recognition of the shape of the representation of the light sources makes it possible:
to compare the levels of the pixels of the first set of the filtered image with calculated levels, emanating from predetermined mathematical functions
to provide a probability of presence of the representation of the estimated light source in the input image.

Advantageously, predetermined mathematical functions are bidimensional Gaussians and the recognition function is effected by application of the method of least squares between the levels of the pixels of the first set and the calculated levels.

The electronic function of recognition of the geometrical disposition of said representations of the sources provides a probability of alignment of said representations of the light sources in the input image. When the representations of the potential sources are aligned along at least one straight line, the electronic recognition function comprises at least one function making it possible to effect a radon transform on the pixels of the filtered image.

When representations of the sources are mobile in the input image, the electronic likelihood estimator comprises at least one electronic function for modeling displacement of the representations of the estimated sources. It also comprises at least one electronic function for estimating displacement making it possible, on the basis of the electronic function for modeling displacement of the representations of the estimated sources:
for each representation of estimated light source of a first estimated image occupying a first position, to calculate the theoretical displacement of said first position;
to calculate a second position occupied by said representation of the estimated light source in a second estimated image;
to compare said second position with the real position of said representation of the light source in said second estimated image.
to provide a probability of displacement of the representation of the source in the estimated image.

Advantageously, the probability of the likelihood of a representation of the estimated light source provided by the electronic unit for validation is equal to the product of the probabilities of presence, of alignment and of displacement of said representation of the light source that are provided by the electronic estimation unit. The electronic unit for validation calculates a rate of rejection of the input image equal to the percentage of representations of estimated sources whose likelihood probability is situated above the second threshold over the total number of representations of estimated sources.

Advantageously, the device comprises an electronic histogram unit making it possible to construct the histogram of the pixels of the image with better contrast, said histogram comprising for each pixel level the corresponding number of pixels. Said electronic histogram unit comprises a function making it possible to determine a third threshold, the level of said third threshold being situated above the mean level of the pixels of the filtered image and below the mean level of the pixels of the representations of the potential light sources. Advantageously, the histogram being represented in the form of a graph having as abscissa the level of the pixels and as ordinate the number of pixels corresponding to this level, the level of the third threshold corresponds to the level which lies at the largest distance from the straight line passing through the maxima in abscissa and in ordinate of this graph.

Advantageously, the device comprises an electronic unit called a recursive filter which determines for a second input image subsequent to a first input image, the value of the first threshold to be applied to this second image, the value of said first threshold of this second image depending at least on the value of the first threshold, of the third threshold and of the rate of rejection of the first input image.

In a principal mode of application, the final image is projected in a viewing system superimposed with an image originating from a second sensor. Preferably, the first sensor is sensitive in the near infrared in the 1 to 2 microns band and the second sensor is sensitive in the middle infrared in the 5 to 20 microns band.

Advantageously, the device is integrated into a viewing system comprising at least one video sensor, the electronic device for image processing and a viewing device, means for locating the position and orientating the video sensor in space, said locating means being interfaced with said processing device, it being possible to render said system mobile, for example by being mounted on a vehicle.

The aeronautical field constitutes a favored application of this type of device. Within this framework, the vehicle is an aircraft and the light sources are runway lamps, the first sensor is sensitive in the near infrared in the 1 to 2 microns band and the second sensor is sensitive in the middle infrared in the 5 to 20 microns band.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawings and description thereof are to be regarded as illustrative in nature, and not as restrictive.

BRIEF DESCRIPTION OF THE DRAWINGS

The invention will be better understood and other advantages will become apparent on reading the description which follows given without limitation and by virtue of the appended figures among which.

DETAILED DESCRIPTION OF THE INVENTION

Figure 1:
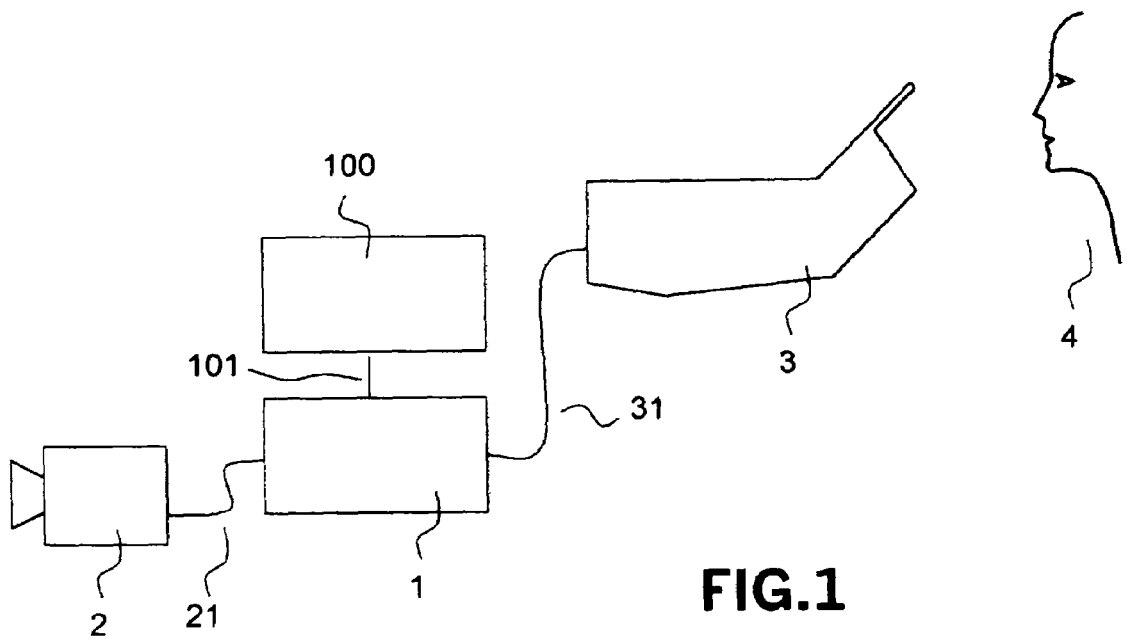
FIG. 1 represents the general diagram of an image acquisition, processing and presentation chain.
Figure 2:
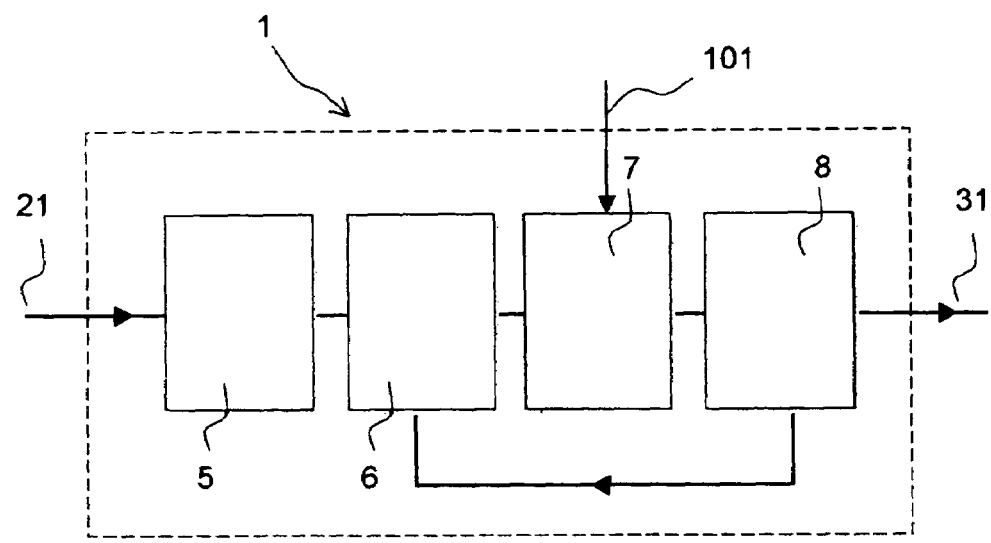
FIG. 2 represents a basic view of the processing device according to the invention.

FIG. 2 represents a basic view of the processing device according to the invention. It essentially comprises four electronic units namely:
- an electronic unit for improving contrast 5 making it possible to provide on the basis of the input image an image with better contrast;
- an electronic selection unit 6 making it possible to provide on the basis of the image with better contrast a filtered image;
- an electronic likelihood estimation unit 7, making it possible to provide an estimated image from the filtered image;
- an electronic validation unit 8 providing the final image from the estimated image.

The unit 5 is interconnected with the sensor 2 by means of the link 21. The unit 7 is interconnected with the device 100 by means of the link 101. The unit 8 is interconnected with the viewing device 3 by means of the link 31.

Figure 3:
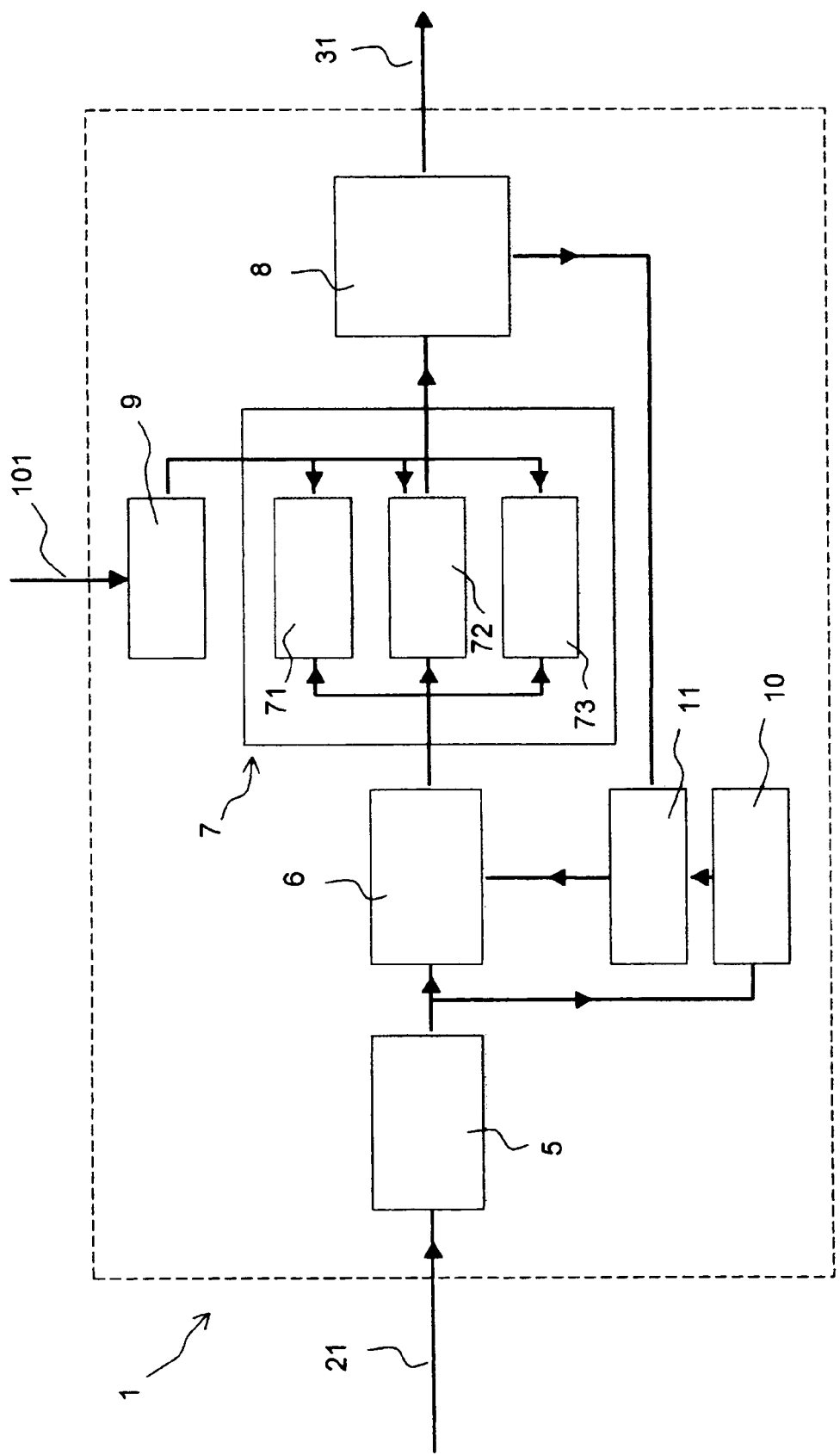
FIG. 3 represents a detailed basic view of the processing device according to the invention.

FIG. 3 represents a detailed view of the principle of the device in FIG. 2. Certain electronic units are detailed, complementary units are appended.

In the two FIGS. 2 and 3, the arrows indicate the interconnections between the various units and the direction of their data exchange.

The electronic unit for contrast improvement makes it possible to boost the contrast of the image. Various procedures exist. A simple way of obtaining this effect is to use a matrix filter of CBF (contrast box filter) type applied to each pixel level of the initial input image so as to obtain the contrasted input image. The matrix of this filter is a square matrix of M rows and M columns of elements, the N central elements having one and the same first value, the other $(M^2-N)$ elements of the matrix having one and the same second value equal to said first value multiplied by $N/(N-M^2)$. At a given pixel P of the input image having a certain level, one obtains the level of the corresponding pixel in the image with better contrast by doing the following operations:
- multiplying the values of the $M^2$ pixels surrounding the pixel P by the values of the corresponding elements of the matrix of the filter, the matrix being centered on the pixel P;
- summing the $M^2$ values obtained so as to obtain the value of the pixel of the image with better contrast.

By way of example, a typical matrix comprises 7 rows and 7 columns, or a total of 49 elements the 9 central elements being equal for example to 1 and the other 40 elements then being equal to $-9/40$. The resulting matrix of the filter is represented hereinbelow:

$-9/40$ $-9/40$ $-9/40$ $-9/40$ $-9/40$ $-9/40$ $-9/40$
$-9/40$ $-9/40$ $-9/40$ $-9/40$ $-9/40$ $-9/40$ $-9/40$
$-9/40$ $-9/40$ 1 1 1 $-9/40$ $-9/40$
$-9/40$ $-9/40$ 1 1 1 $-9/40$ $-9/40$
$-9/40$ $-9/40$ 1 1 1 $-9/40$ $-9/40$
$-9/40$ $-9/40$ $-9/40$ $-9/40$ $-9/40$ $-9/40$ $-9/40$
$-9/40$ $-9/40$ $-9/40$ $-9/40$ $-9/40$ $-9/40$ $-9/40$

The electronic selection unit 6 preserves the pixels of the image with better contrast whose level is situated above a first threshold, the level of the other pixels being reduced to 0. The filtered image thus now contains only a first set of pixels corresponding to potential light sources.

The electronic likelihood unit can comprise 3 units as is indicated in FIG. 3.

The first of these units 71 is tasked with the recognition of the shape of the light sources. In the general case, the sources being situated a large distance from the image sensor, their representations ought to appear as luminous sets of small dimension, covering at most a few pixels. A good mathematical representation of the distribution of the energy of the representation of the source, in this case, is a bidimensional Gaussian. The unit responsible for identifying the representations of the potential sources compares the levels of the distributions of pixels of the filtered image with those of a bidimensional Gaussian representation by varying four parameters: the level of the Gaussian, its width at mid-height along a first axis, its width at mid-height along a second axis perpendicular to the first, the inclination of the first axis in the reference frame of the image. The comparison is done by applying the method of least squares between the levels of the pixels of the first set and the calculated levels of the Gaussian. The residual error of the optimization procedure makes it possible to estimate the probability of presence of a source representation. When this probability is greater than a certain threshold, the representation of the potential source is replaced in the estimated image with its Gaussian representation. It should be noted that this procedure makes it possible to determine the position of the representations of the sources with an accuracy of less than a pixel.

The second of these units 72 is tasked with the recognition of the geometrical disposition of the representations of the sources. In an aeronautical application, the runway lamps are disposed according to codified geometrical structures representative of the runway axes which are straight lines or straight line segments. The second unit makes it possible to search for the presence of such structures in the filtered image. The mathematical function used is a radon transform. The principle thereof consists in searching the image for the favored directions where the mean energy of the pixel is significant and may consequently correspond to axes of alignment of light sources.

The third of these units 73 is tasked with providing a probability of displacement of representations of the light sources. Said specialized unit is used either when the sources present in the scene are displacing in a known manner, or when the device is located on a moving vehicle and when the displacements and the orientation of the vehicle are known; this being the case for aircraft. As input data it has, on the one hand, the knowledge of the initial positions of the representations of the estimated sources in a first filtered image and on the other hand, the information from an electronic unit providing a displacement model 9. For a moving vehicle, this model is interfaced with the vehicle's locating means 100. It calculates the second positions occupied by said representations of the estimated light sources in a second input image. It compares said second positions with the real positions of said representations of the light sources in the second input image. It then provides a probability of displacement of the representations of the sources.

The unit 8 undertakes the following tasks:

calculating the probability of likelihood of a representation of estimated light source which is equal to the product of the probabilities of presence, of alignment and of displacement of said light source that are provided by the electronic estimation units 71, 72 and 73.

eliminating from the estimated image the representations of the estimated sources whose likelihood probability is situated below the second threshold. The second threshold is equal to around 95% so as to construct the final image, said final image being provided at the viewing device.

calculating a rate of rejection of the input image equal to the percentage of representations of sources present in the final image over the total number of representations of sources present in the estimated image.

providing the unit 6 with the calculated rejection rate.

When the rejection rate is low, this signifies that all the representations of estimated sources correspond to real sources present in the scene and consequently, the level of the first threshold is too significant. When the rejection level is significant, it is necessary, on the contrary to raise the threshold level which is too low.

Figure 4:
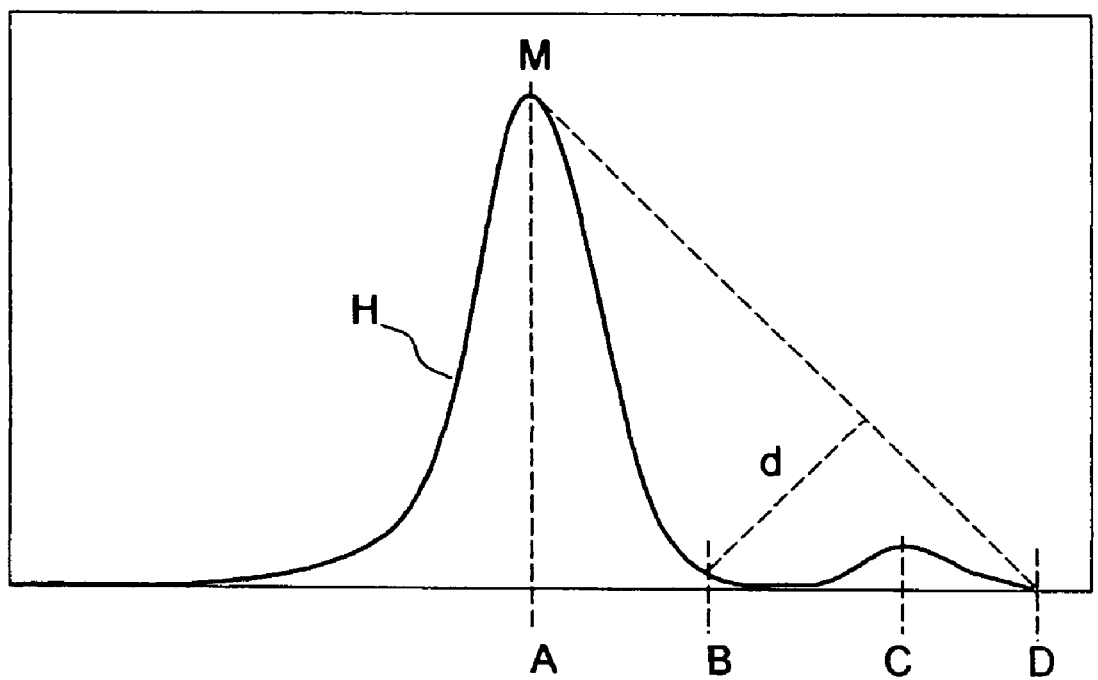
FIG. 4 represents the principle of the determination of the third threshold in the graph of the histogram of the pixel levels.

Two additional electronic units figure in FIG. 3. The unit 10 is a unit making it possible to construct the histogram of the pixels of the image with better contrast, the graph of the histogram H represented in FIG. 4 comprises as abscissa the level of the pixels and as ordinate the number of pixels corresponding to this level. Said electronic histogram unit comprises a function making it possible to determine a third threshold B, the level of said third threshold being situated above the mean level A of the pixels of the contrasted image and below the mean level C of the pixels of the representations of the potential light sources. The level of the third threshold B corresponds to the level which lies at the largest distance d from the straight line MD passing through the maxima in abscissa D and in ordinate M of the graph of the histogram H.

The unit 11 called a recursive filter determines for a second input image subsequent to a first input image, the value of the first threshold to be applied to this second image, the value of said first threshold of this second image depending at least on the value of the first threshold, of the third threshold and of the rate of rejection of the first input image. It comprises a low-pass filter for stabilizing the system making it possible to avoid overly abrupt variations of the final image. Its cutoff frequency is less than 5 Hz.

The whole set of functions of the electronic units may be implemented in electronic components comprising matrices of logic gates (AND or OR). These components may be of nonprogrammable type such as, for example, ASICs (Application Specific Integrated Circuits); in this case, the information is burnt into the circuit during construction. These components may also be programmable such as, for example, FPGAs (Field Programmable Gate Arrays) or EPLDs (Erasable Programmable Logic Devices). These components are commonly used for applications of professional electronics or aboard aircraft.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An electronic device for image processing generating an output image from an input image, the two images being composed of pixels, the input image originating from a first video sensor and representative of a scene having at least one discrete light source, said input image having a first representation of said discrete light source, the output image having a second representation of said discrete light source, said electronic device comprising:

first electronic unit for improving contrast making it possible to provide on the basis of the input image an image with better contrast;

second electronic unit for selection making it possible to provide on the basis of the image with better contrast a filtered image now having only at least a first set of pixels whose electronic level is situated above a first threshold, said first set corresponding to the representation of at least one potential light source;

electronic likelihood estimation unit, making it possible to provide on the basis of the first set of pixels of the filtered image an estimated image having a second set of pixels, said second set corresponding to the representation of estimated light sources, the distributions of the pixels of the representation of the estimated sources corresponding to bidimensional mathematical functions; with each representation of estimated light source there being associated a likelihood probability;

third electronic unit for validation providing on the basis of the estimated image the final image, said image containing a representation of the estimated light source if the associated likelihood probability is greater than a second threshold.

2. The electronic device for image processing as claimed in claim 1, wherein the level of the first threshold depends at least on said validation unit.

3. The electronic device for image processing as claimed in claim 1, wherein said electronic function for improving the contrast of the initial input image comprises at least one matrix filter of CBF (contrast box filter) type applied to each pixel level of the initial input image to obtain the contrasted input image.

4. The electronic device for image processing as claimed in claim 3, wherein said matrix is a square matrix of M rows and M columns of elements, the N central elements having one and the same first value, the other $(N-M^2)$ elements of the matrix having one and the same second value equal to said first value multiplied by $N/(M^2-N)$.

5. The electronic device for image processing as claimed in the preceding claim 1, wherein the electronic likelihood estimator has at least one electronic function for recognition of the shape of the representation of the light source making it possible:

to compare the levels of the pixels of the first set of the filtered image with calculated levels, emanating from predetermined mathematical functions to provide a probability of presence of the representation of the estimated light source in the input image.

6. The electronic device for image processing as claimed in claim 5, wherein the predetermined mathematical functions are bidimensional Gaussians.

7. The electronic device for image processing as claimed in claim 6, wherein the recognition function is effected by applications of the method of least squares between the levels of the pixels of the first set and the calculated levels.

8. The electronic device for image processing as claimed in the preceding claim 1, wherein, the filtered image comprising at least two representations of potential light sources, the electronic likelihood estimator comprises at least one electronic function the recognition of for geometrical disposition of said representations, said function providing a probability of alignment of said representations of the light sources in the input image.

9. The electronic device for image processing as claimed in claim 8, wherein when the representations of the potential sources are aligned along at least one straight line, the electronic recognition function comprises at least one function making it possible to effect a radon transform on the pixels of the filtered image.

10. The electronic device for image processing as claimed in claim 1, wherein, the representations of the sources being mobile in the input image, the electronic likelihood estimator comprises at least one electronic function for modeling displacement of the representations of the estimated sources.

11. The electronic device for image processing as claimed in claim 10, wherein the electronic likelihood estimator comprises at least one electronic function for estimating displacement making it possible, on the basis of the electronic function for modeling displacement of the representations of the estimated sources:
   for each representation of estimated light source of a first estimated image occupying a first position, to calculate the theoretical displacement of said first position;
   to calculate a second position occupied by said representation of the estimated light source in a second input image;
   to compare said second position with the real position of said representation of the light source in said second input image.
   to provide a probability of displacement of the representation of the source in the input image.

12. The electronic device for image processing as claimed in claim 4, wherein, the probability of the likelihood of the representation of an estimated light source provided by the electronic unit for validation is equal to the product of the probabilities of presence, of alignment and of displacement of said representation of the light source that are provided by the electronic estimation unit.

13. The electronic device for image processing as claimed in claim 1, wherein the third electronic unit for validation calculates a rate of rejection of the input image equal to the percentage of representations of estimated sources whose likelihood probability is situated above the second threshold over the total number of representations of estimated sources.

14. The electronic device for image processing as claimed in claim 1, wherein the device comprises an electronic histogram unit making it possible to construct the histogram of the pixels of the image with better contrast, said histogram providing the number of pixels corresponding to a given energy level.

15. The electronic device for image processing as claimed in claim 14, wherein the electronic histogram unit comprises a function making it possible to determine a third threshold, the level of said third threshold being situated above the mean level of the pixels of the filtered image and below the mean level of the pixels of the representations of the potential light sources.

16. The electronic device for image processing as claimed in claim 15, wherein, the histogram being represented in the form of a graph having as abscissa the level of the pixels and as ordinate the number of pixels corresponding to this level, the level of the third threshold corresponds to the level which lies at the largest distance from the straight line passing through the maxima in abscissa and in ordinate of the histogram.

17. The electronic device for image processing as claimed in claim 1, wherein the device comprises an electronic unit called a recursive filter which determines for a second input image subsequent to a first input image, the value of the first threshold to be applied to this second image, the value of said first threshold depending at least on the value of the first threshold, of the third threshold and of the rate of rejection of the first input image.

18. The device for image processing as claimed in claim 1, wherein the final image is projected in a viewing system superimposed with an image originating from a second sensor.

19. The electronic device for image processing as claimed in claim 18, wherein the first sensor is sensitive in the near infrared in the 1 to 2 microns band and the second sensor is sensitive in the middle infrared in the 5 to 20 microns bands.

20. A viewing system comprising:
   one video sensor,
   an electronic device for image processing, and
   a viewing device,
   means for locating the position and orientating the video sensor in space, said image processing being according to claim 1, said locating means being interfaced with said device, it being possible to render said system mobile.

21. An aircraft comprising a viewing system as claimed in claim 20, the viewing device being a so-called head-up viewfinder, the light sources being runway lamps.

* * * * *